US006674256B2

(12) United States Patent
Choi et al.

(10) Patent No.: US 6,674,256 B2
(45) Date of Patent: Jan. 6, 2004

(54) BATTERY POWERED, JOYSTICK CONTROLLED FOLDING WHEELCHAIR

(75) Inventors: Oong Choi, Lancaster, PA (US); Henry Jones, Manheim, PA (US); Fred E. Ingle, Lancaster, PA (US)

(73) Assignee: Mobility E-Z, LLC, Lancaster, PA (US)

( * ) Notice: Subject to any disclaimer, the term of this patent is extended or adjusted under 35 U.S.C. 154(b) by 0 days.

(21) Appl. No.: 09/884,136

(22) Filed: Jun. 20, 2001

(65) Prior Publication Data

US 2002/0017404 A1 Feb. 14, 2002

Related U.S. Application Data

(60) Provisional application No. 60/212,821, filed on Jun. 21, 2000.

(51) Int. Cl.[7] .................................................. B62D 5/04

(52) U.S. Cl. ............................ 318/139; 318/41; 318/55

(58) Field of Search ............................ 318/139, 34, 41, 318/53, 54, 55, 59, 62, 293

(56) References Cited

U.S. PATENT DOCUMENTS

| | | | | | |
|---|---|---|---|---|---|
| 3,577,054 | A | * | 5/1971 | Banks | |
| 3,814,199 | A | * | 6/1974 | Jones | |
| 3,956,021 | A | * | 5/1976 | Tsygankov et al. | |
| 4,059,786 | A | * | 11/1977 | Jones et al. | 318/17 |
| 4,311,205 | A | * | 1/1982 | Goodacre et al. | 180/68.5 |
| 4,634,941 | A | * | 1/1987 | Klimo | 318/139 |
| 5,033,000 | A | * | 7/1991 | Littlejohn et al. | |
| 6,183,002 | B1 | | 2/2001 | Choi et al. | |
| 6,329,771 | B1 | | 12/2001 | Choi et al. | |
| 6,331,013 | B2 | | 12/2001 | Choi et al. | |

OTHER PUBLICATIONS

U.S. patent application Publication US 2001/0005073 A1, Choi et al., filed Dec. 21, 2000, published Jun. 28, 2001.

* cited by examiner

*Primary Examiner*—Bentsu Ro
(74) *Attorney, Agent, or Firm*—Crowell & Moring LLP

(57) ABSTRACT

A battery powered, joystick controlled wheelchair includes a battery by which a supply of power can be provided, a joystick by which voltages proportionate to degrees of lean from a neutral position can be produced from the supply of power, and a master power switch by which the supply of power to the joystick can be turned on and off. It is detected whether the voltages produced are forward or reverse direction voltages, and pulse width modulation, resulting in a pulse train, is provided. The pulse train is amplified to deliver driving power with a polarity consistent with a detected direction, and motors are driven by the driving power and, in turn, drive the wheelchair.

4 Claims, 8 Drawing Sheets

BATTERY POWERED, JOYSTICK CONTROLLED FOLDING WHEELCHAIR

This application claims the priority of provisional patent application No. 60/212,821, filed Jun. 21, 2000, the entire disclosure of which is incorporated herein by reference.

BACKGROUND OF THE INVENTION

The present invention is a battery powered, joy stick controlled for speed and direction, easily folding, light weight wheel chair.

The marketplace for powered wheelchairs is mainly populated by devices with heavy steel frames supporting heavy upholstered chairs and having big motors and heavy automobile type storage batteries. These robust components together make a wheelchair so heavy that, while it functions well as a powered wheelchair, it becomes very burdensome to transport from one venue to another. Hence, there is a need for a wheelchair that is light weight and nimble, and whose light weight enables smaller motors and smaller batteries to perform equally as well as its heavy counterparts, resulting in a truly portable mobility aid that can be transported in a back seat floor or the trunk of a car, rather than a specialized van.

SUMMARY OF THE INVENTION

According to this invention, the need mentioned above is met by a battery powered, joystick controlled wheelchair including a battery by which a supply of power can be provided, a joystick by which voltages proportionate to degrees of lean from a neutral position can be produced from the supply of power, and a master power switch by which the supply of power to the joystick can be turned on and off. A determination is made as to whether the voltages produced are forward or reverse direction voltages, and pulse width modulation, resulting in a pulse train, is provided. The pulse train is amplified to deliver driving power with a polarity consistent with a detected direction, and motors are driven by the driving power and, in turn, drive the wheelchair.

In the particular embodiment disclosed, the motors are dc motors, and the battery is a 12 volt battery. The master power switch, moreover, is interposed between the battery and the joystick. The wheelchair is preferably a folding wheelchair.

The wheelchair preferably has a frame which is at least partly constructed from metal tubing. Wheels for locomotion are driven by the motors, and pairs of plates, between which each of the wheels for locomotion is mounted, are provided. One plate of each of the pairs of plates is a mounting plate to which one of the motors is mounted. Screws mount each of the motors to the respective mounting plate.

A method of operating the battery powered, joystick controlled wheelchair includes providing a supply of battery power which can be turned on and off to a joystick, producing voltages from the supply of battery power which are proportionate to degrees to which the joystick leans from a neutral position, and detecting whether the voltages produced are forward or reverse direction voltages. Pulse width modulation, resulting in a pulse train, is provided, and the pulse train is amplified to deliver driving power with a polarity consistent with a detected direction. Motors are driven with the driving power and, in turn, drive the wheelchair.

Another feature of the invention concerns a battery storage assembly adapted for use in a battery powered, joystick controlled wheelchair. The battery storage assembly includes a battery container defining a volume within which the battery can be received. A lid is hinged on the battery container so as to be movable between an open position and a shut position. The lid serves as a platform upon which the battery can be laid. A battery contact is adapted to contact a battery terminal when the lid is moved to the shut position, and a latch can be used to lock the lid in the shut position. The latch is used to press the battery terminal to the battery contact when the latch locks the lid in the shut position. The battery storage assembly further includes an electronics board interconnected with the battery contact, and a cover enclosing the electronics board.

Other features and advantages of the invention will be clear from the description of the invention which follows.

DESCRIPTION OF THE PREFERRED EMBODIMENT

As can be seen from the illustrations, the present invention is constructed from heavy duty aluminum tubings 10, double framed and reinforced with solid aluminum plugs. The seat bottom 12, the seat back 14 and the arm rests 16 are made of upholstered fabrics for comfort and "breathability". The structure of the chair is so designed to bear the weight of a normal adult safely, yet to be capable of quick and easy folding and unfolding. There are safety locking latches (not shown) to prevent accidental folding while in use.

Figure 1:
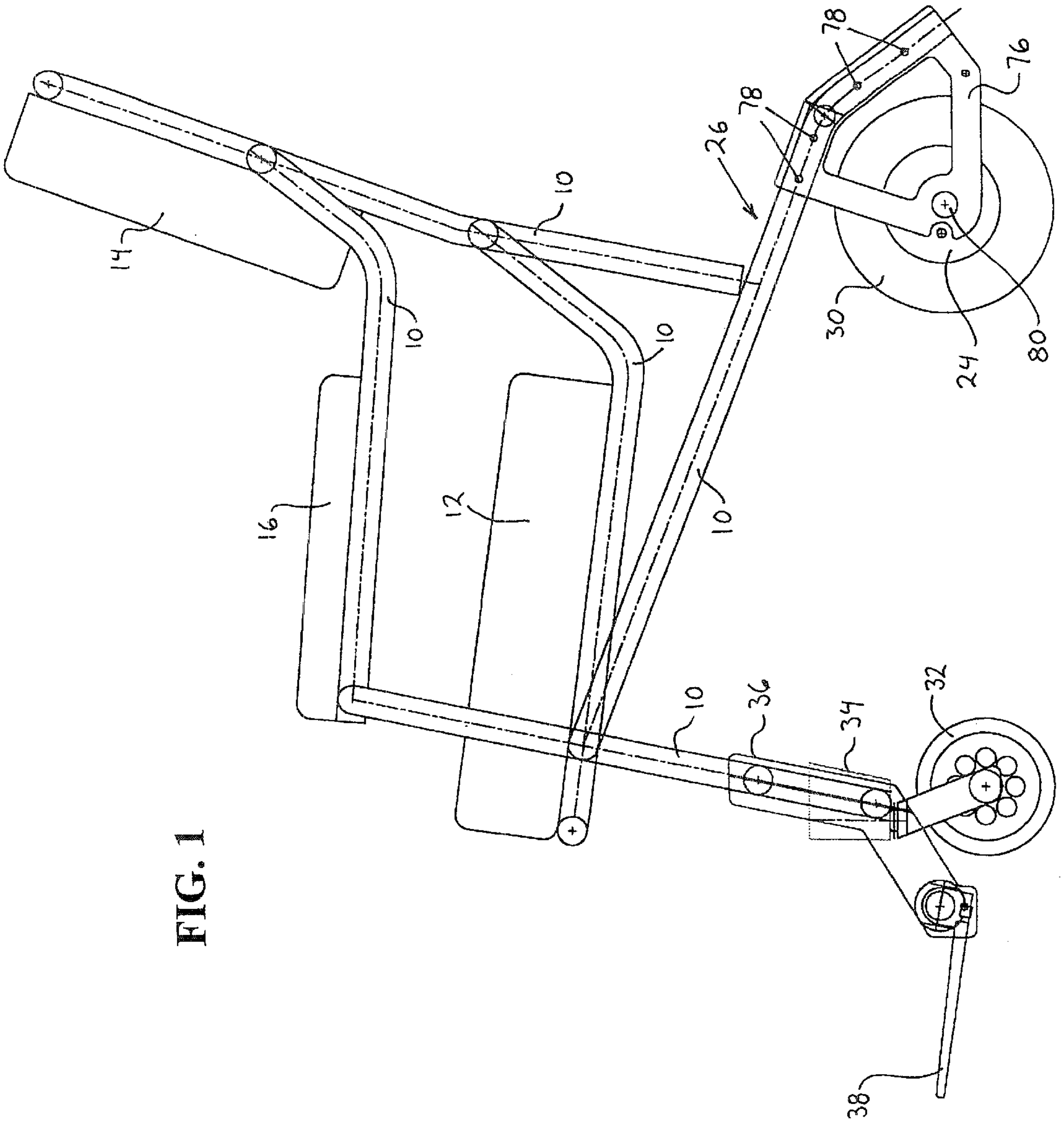
FIG. 1 is a schematic side view of the chair frame of the invention.
Figure 2:
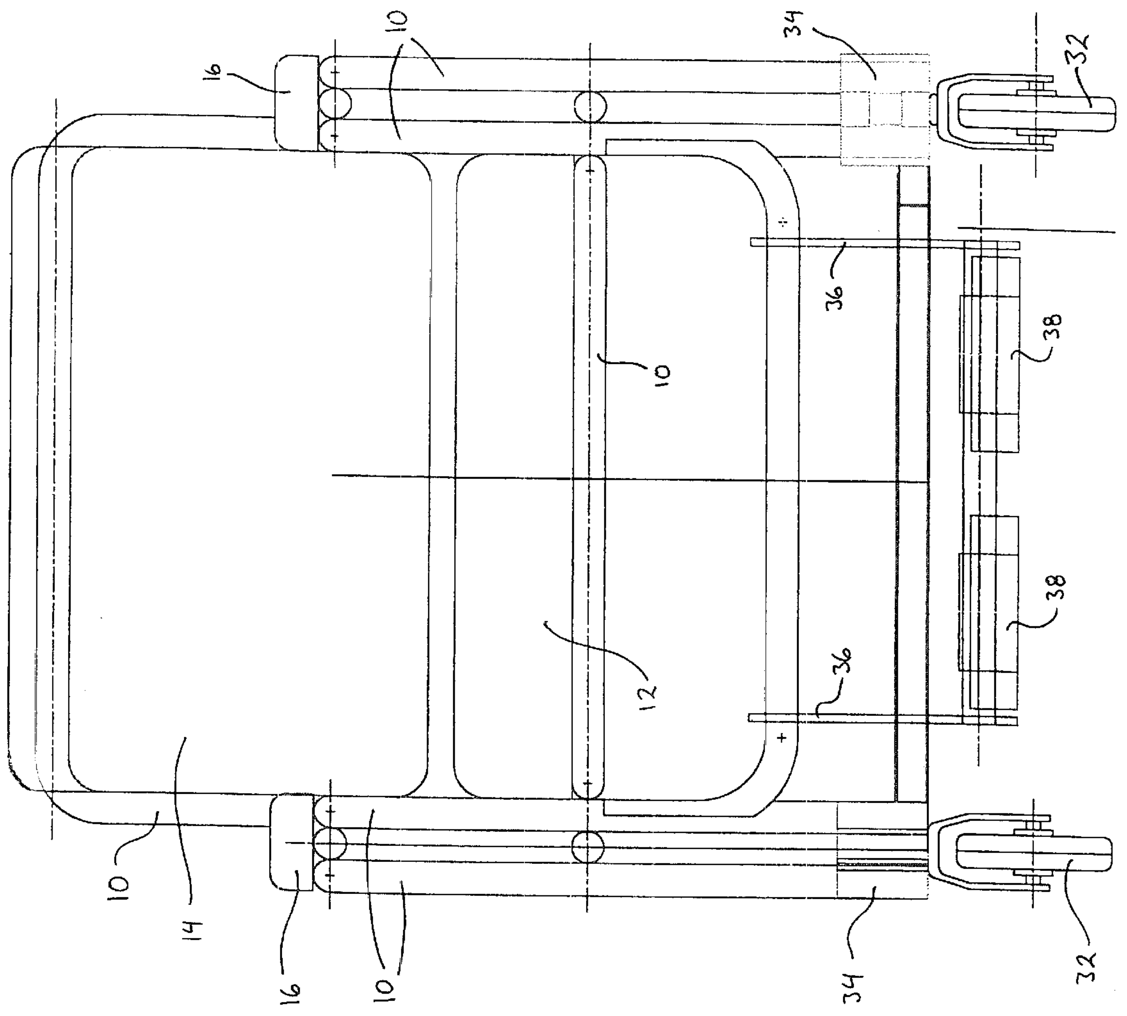
FIG. 2 is a schematic front view of the chair frame shown in FIG. 1.
Figure 3:
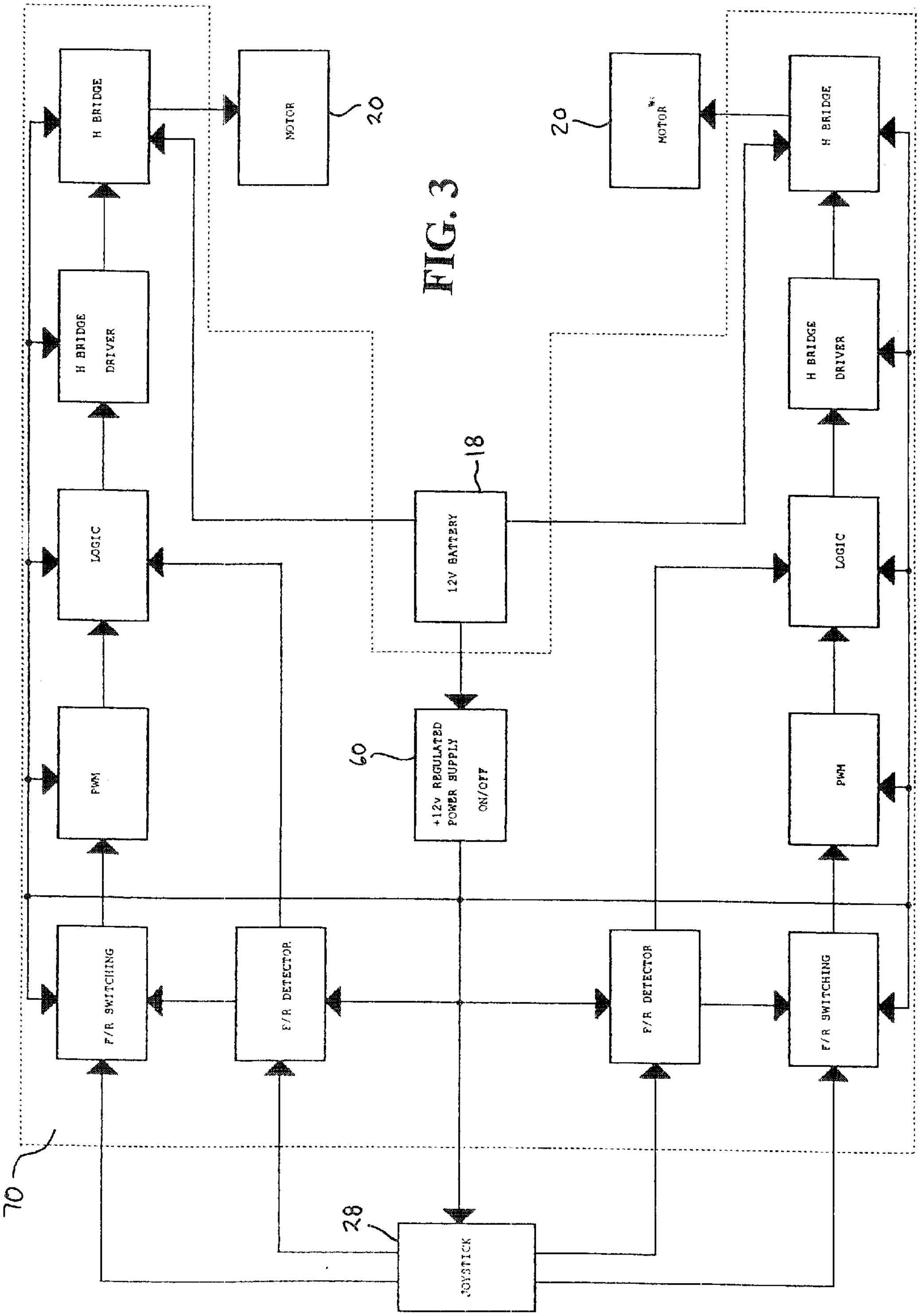
FIG. 3 is a block diagram of the overall wheelchair controller.
Figure 4:
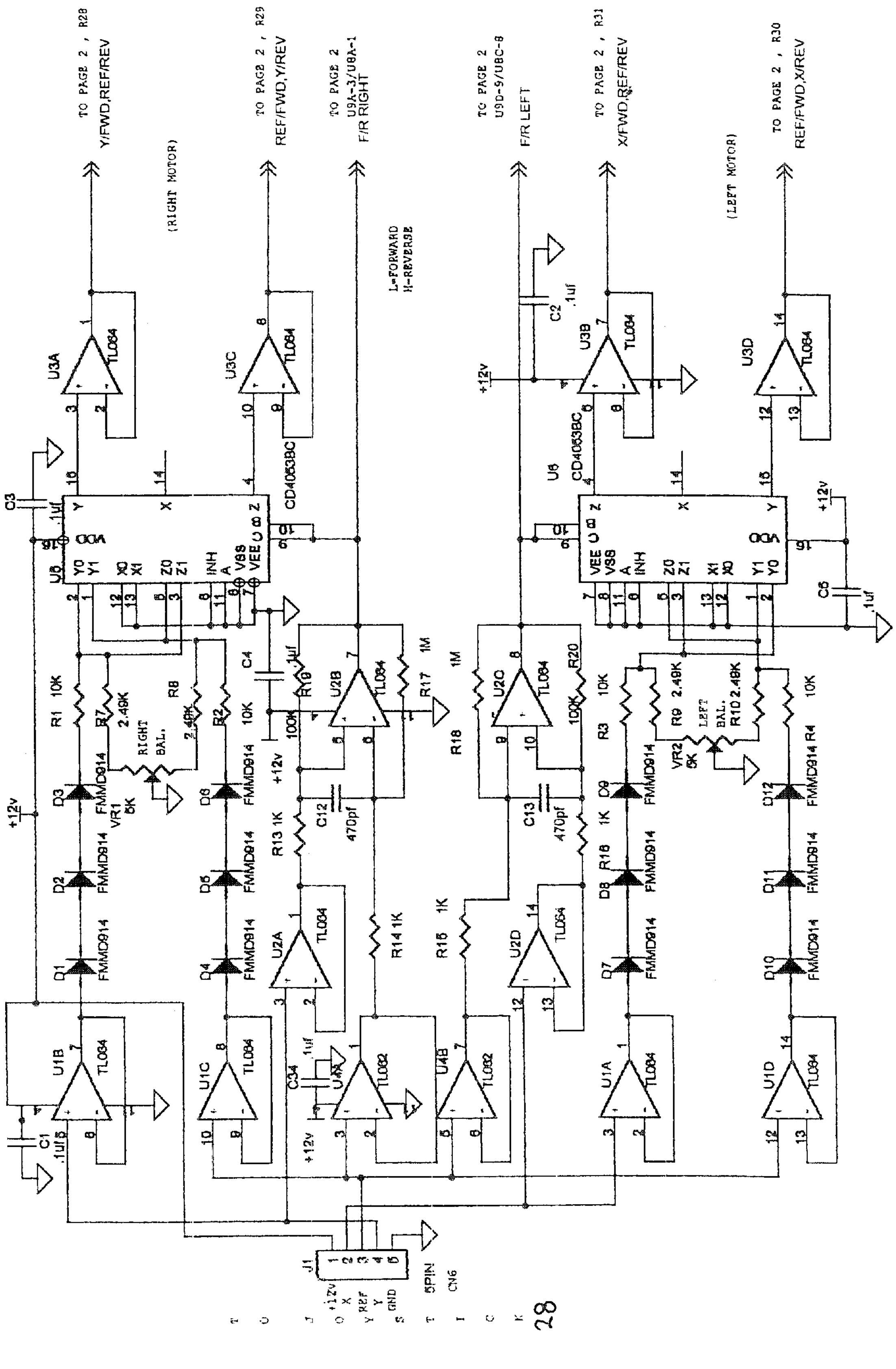
FIG. 4 is a schematic illustration of forward/reverse detector and switching circuitry according to the invention.
Figure 5:
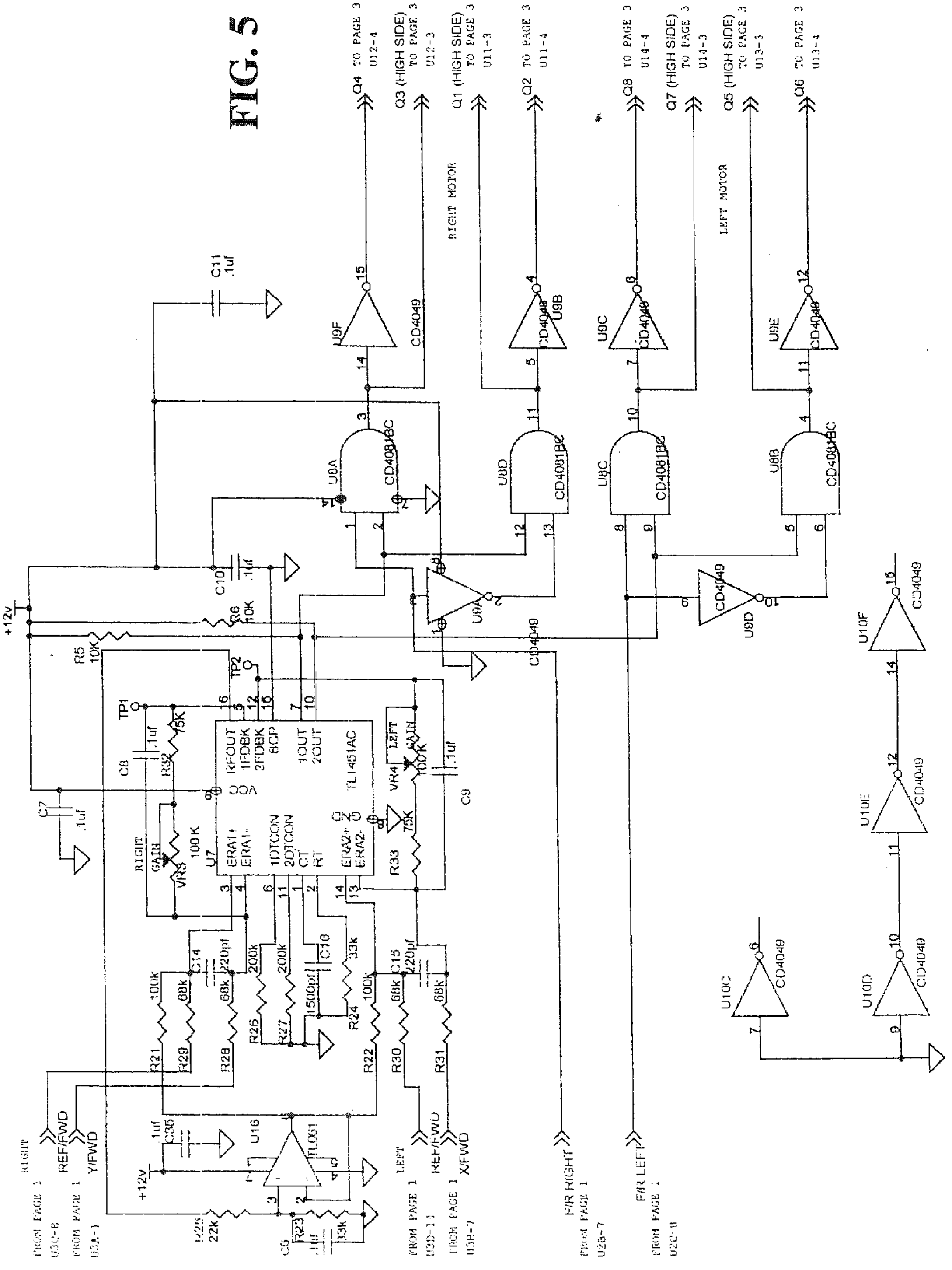
FIG. 5 is a schematic illustration of pulse width modulation and logic circuitry according to the invention.
Figure 6:
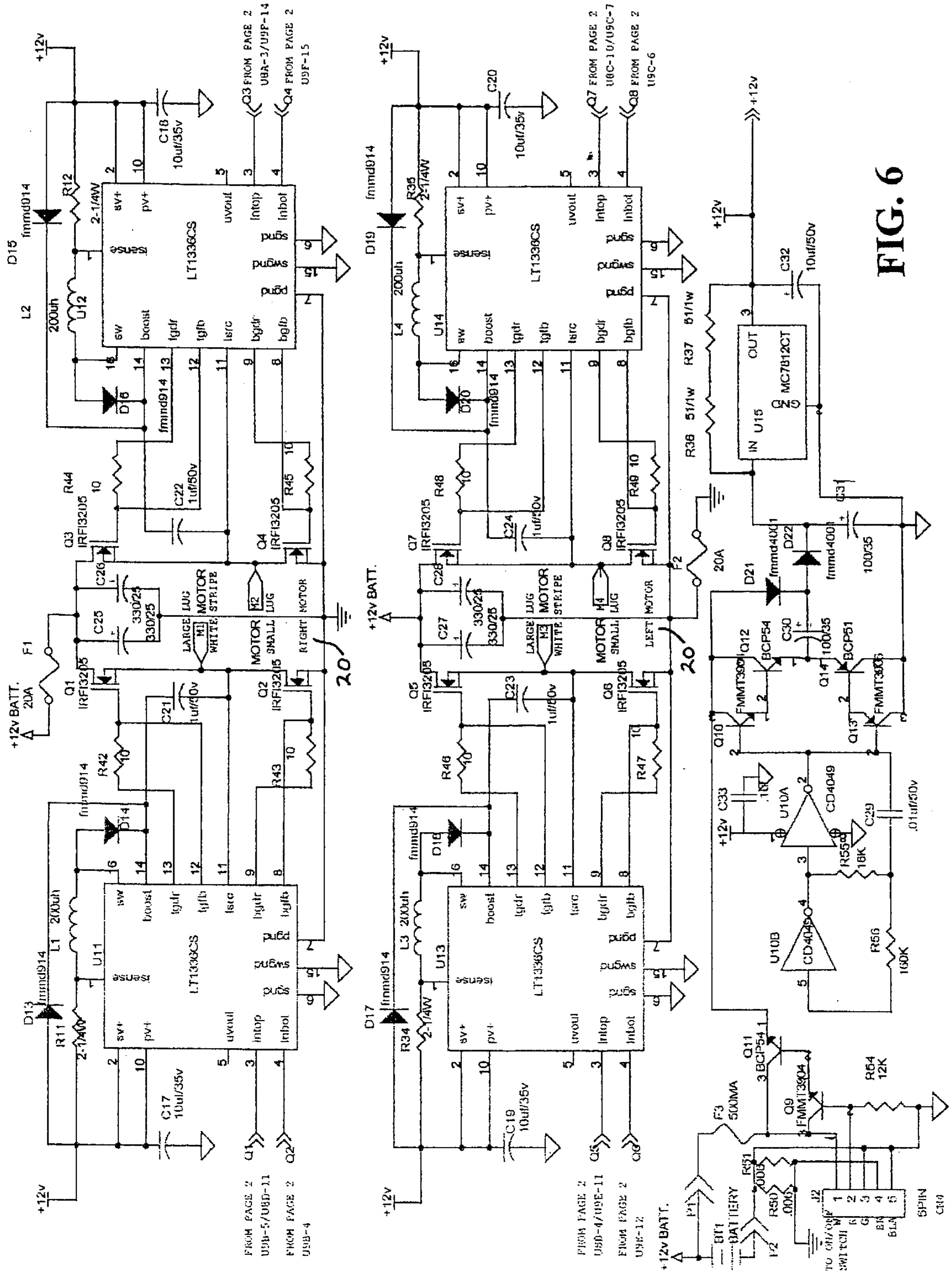
FIG. 6 is a schematic illustration of H bridge and high side drivers/power supply circuitry according to the invention.

Locomotion is provided by a storage battery 18 and a pair of dc motors 20 with output shafts 22 which are geared down and linked to the hubs 24 of wheels located at the foot of each rear leg 26 of the chair. The amount of power provided to each of the motors 20 is determined by the position of the joy stick or control stick 28, schematically shown in FIG. 3, which is located at the forward edge of one of the arm rests of the chair. Leaning the control stick 28 forward causes the chair to move forward. Leaning the control stick 28 back causes the chair to move rearward. In each of the directions, the more the stick 28 is moved from the neutral vertical position, the faster the chair moves in that direction. Leaning the stick 28 to the right causes the device to steer to the right depending on whether the stick 28 is directed to forward or rearward. If the stick 28 is leaned to right or left without leaning forward or rearward, the device rotates on it own axis, to either the right or left. Again, the speed of the rotation depends on how far the stick 28 is leaned to that direction. This type of stick control is called a proportionate control, in contrast to an on-off switch.

When the chair is brought to standstill, the rider can apply a parking brake for each of the drive wheels by a compound lever and a knurled brake shoe against the edge of the tire. The compound lever enables the user to apply a large pressure on the brake shoe with little force.

Folding the chair is accomplished by first unlatching the safety latch, one on each side, and pulling the seat bottom 12 toward the seat back. There is a kick stand near the bottom of the folded chair to enable the chair to stand upright.

The chair of the present invention is essentially an aluminum folding chair, similar to a lawn chair, except that the load bearing parts are double framed, the wheels for locomotion include pneumatic tires 30, and rubber casters 32 for the front are added. Double framing and precision fastening of the chair give it rigidity and stability, necessary characteristics for the safety and comfort of the rider. Each front wheel mount 34, a precision machined solid aluminum block, fits tightly to the double tubes 10 of the frame, maintaining the alignment of the caster radial axis. Lack of this alignment results in additional power requirement in steering from side to side, and also causes unstable oscillation of the casters 32 when going straight forward. The two cross members 36 supporting the footrests 38 also assist in providing rigidity to the chair frame.

The folding pivot point is chosen deep in the rear of the chair in order to provide maximum lever possible to accommodate easy folding and unfolding. When the chair is unfolded or open, two positive locking latches are buckled down to prevent any accidental folding of the chair. There is a folding kick stand, such that the folded chair can be left to stand upright by itself; this is a convenient feature not only for storage purpose, but also for momentary non-attendance to unlock a car door or a trunk lid.

The battery storage box 40 is so designed that the bottom hinged lid 42 serves as a platform upon which to lay the battery 18 flat on its side. By lifting the lid 42 shut, the battery 18 is automatically positioned to make correct contact with battery contact 44 electrically, without any additional motion to secure electric corrections, such as bolting on power cables to the battery terminals 46. The battery box 40 is located near the bottom center in order to lower the center of gravity of the entire system, while at the same time the battery box lid 42 is unobstructed from opening even when the chair is folded. Users may desire access to the battery 18 for recharging purposes after the device is stored in the trunk. Conversely, the battery 18 may easily be removed prior to lifting the device to the trunk, thereby reducing the weight of the device by thirteen pounds.

The chair itself is designed to be loaded into a car or a van without the use of a special lift or a ramp, or any disassembly of any part of the chair. Not even the footrests 38 need to be loosened. All one needs to do to load the chair into a car is to simply fold the chair in one motion. Therefore, there is no need to carry a tool to loosen or retighten any nuts, bolts or screws. This is one outstanding feature of this invention.

There are two parking brakes, one on each side of the chair and easily reachable by the rider. The purpose of the parking brake is to hold the chair in a given location, for getting on and off the chair as well as to hold the chair on an incline without sliding back or forward. Braking action is accomplished by a brake shoe pinching on the surface of the pneumatic tire 30 through a compound lever that produces a high mechanical advantage for a relatively small effort.

The chair is equipped with a seat bottom 12 and seat back 14 of three and half inch of foam cushions covered with non-mildewing fabric. The latter is also the material covering two cushioned arm rests 16.

Directly coupled to the rear pneumatic wheels 30 are reduction gears to which are connected the two electric motors 20. The motors 20 provide locomotive power to the chair. These motors 20 are driven by series of pulsed electric current that is unique to the present invention. It is the design of these pulses that give unique advantage to the device, in terms of the efficiency of power transfer from the battery 18 to the motors 20, thereby producing more distance of travel per given electric charge.

The master power switch 60 is turned on and off by a matching key inserted in its slot and rotated to designated positions. When the power is on, the joystick 28 produces voltages proportionate to the degree of lean from neutral position which is perpendicular to the plane of the control console. These voltages are analyzed for its directions, e.g., forward or reverse, and the magnitude of the voltage. The magnitude of the voltage produced is converted to a train of constant voltage pulses whose "on" period is directly proportional in a constant frequency pulses. This technique is also known as pulse width modulation. The resulting pulse train is amplified through power amplifiers which deliver the full battery power to the motors 20 in the polarity consistent with the direction detected earlier.

When the joystick 28 is brought to the neutral position, in addition to bringing the input current to nil, the circuit applies a shunt across the motor terminals thereby short-circuiting the electric current generated in the motor by the momentum of the moving chair, in effect applying a dynamic brake.

It is the use of the pulsed train of current, rather than analog voltages, that is especially beneficial in an application where the total available energy is limited such as a battery powered wheel chair. An analog amplifier achieves its varying voltages by converting to heat the portion of the output voltage difference from the maximum source voltage. Such conversion to heat is not only wasteful of energy, but also a big nuisance because a way must be provided to rid of the heat away from the sensitive electronic circuitry.

On the other hand, the pulse train method is a heat free method. The power amplifier is either on fully or off completely. In either state, there is no "in between" state which requires a modifying resistance which is the cause of heat generation. The power amplifier stage can be viewed as a varying resistor, when used as an analog amplifier. When the amplifier produces an analog voltage which is not the full amplitude, it does so by becoming a series resistor. It is this phenomenon that produces the heat. In a pulsed amplifier, there are no voltages to be produced other than the full amplitude which corresponds to the "on" cycle, or "off" cycle at which time the amplifier is turned off, thus no current is available to produce heat. In a real world, there is no such thing as a perfect conductor or perfect insulator. Therefore, some heat is generated even in a pulsed mode amplifier. The amount of this heat, however, is minuscule in comparison to an analog amplifier. This is a very important feature in an application such as a portable wheel chair which must utilize the limited amount of stored energy in the battery.

The lid 42 of the battery storage box 40 is a hinged door whose buckled latch or lock 50 provides an additional function of applying pressure on the electric contacts of the battery terminals 46 to the system intake points built into the battery storage box 40. Therefore, when one places the battery 18 on the hinged door of the storage box 40 and closes the door and locks it with the buckled lock 50, the battery automatically makes a secure electric contact with the system, without the use of any tools to attach any battery cables or plug any electric connectors. This is what is meant in saying that this wheel chair requires no special tools in connecting the battery 18 or disconnecting the same.

Figure 8:
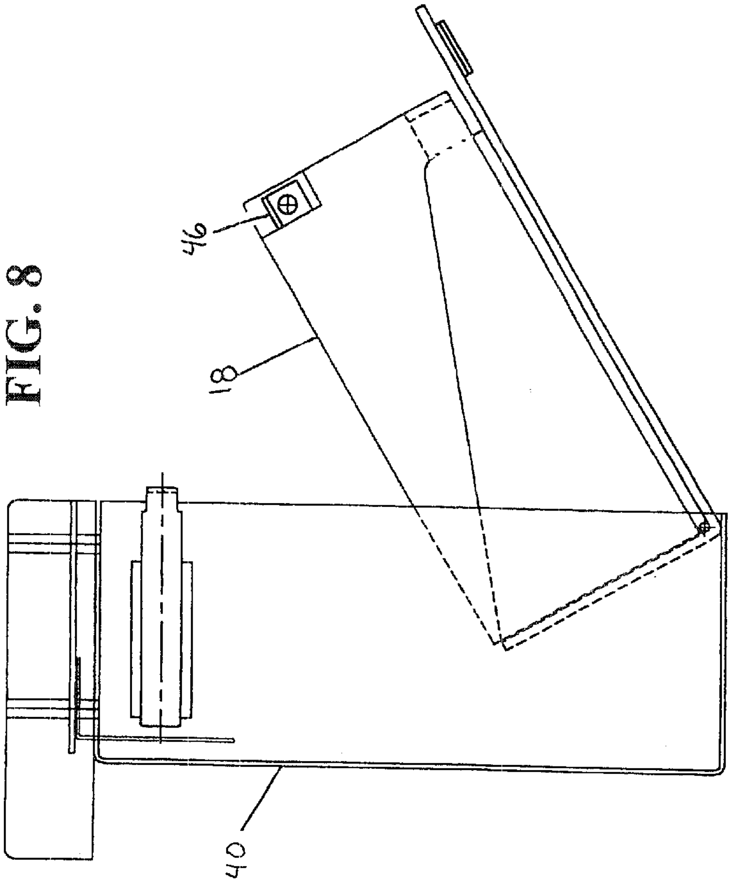
FIGS. 7 and 8 are illustrations of the battery box assembly according to the invention.
Figure 7:
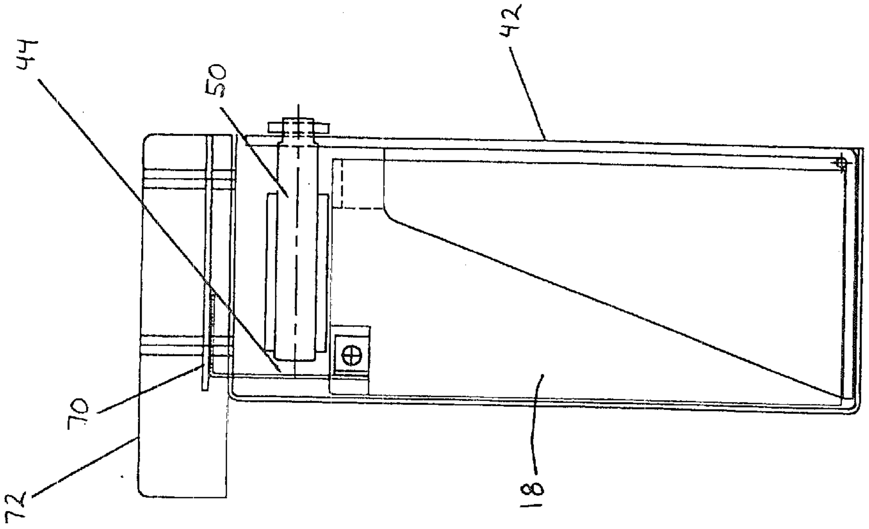

FIGS. 7 and 8 schematically show the circuit or electronics board 70 interconnected with the battery contact 44 and enclosed by an electronics cover 72.

Figure 9:
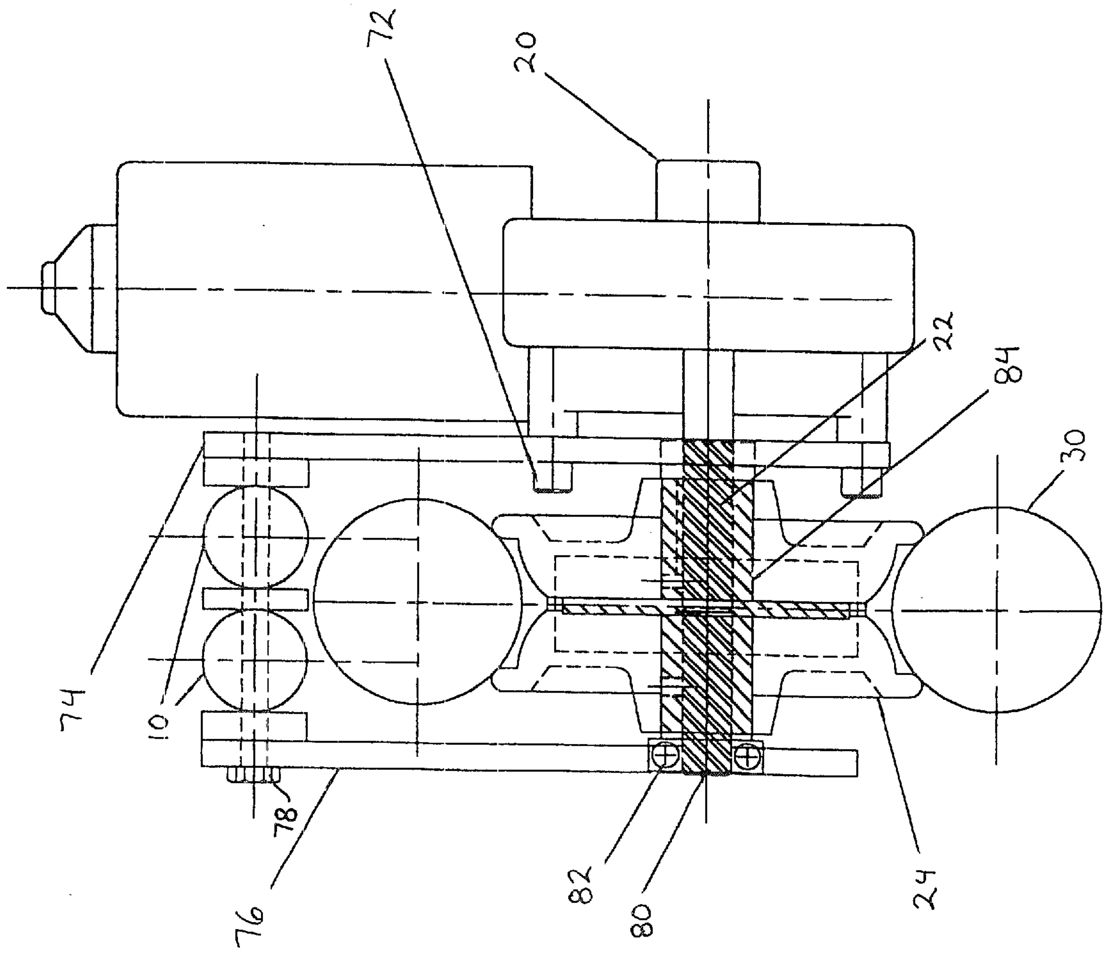
FIG. 9 is a part-sectional view of the motor and drive wheel assembly according to the invention.

The details of mechanical couplings from each motor output shaft 22 to the respective drive wheel hub 24 are shown in FIG. 9. The motor rotation is reduced by a worm gear which is imbedded to the hub 24 of the drive wheel which has the pneumatic tire 30, providing a moderate amount of absorbing shocks and sufficient areas of ground contact. A knurled shaft is pressed to the nylon worm gear, providing the mechanical integrity of the gear shaft. The same shaft is also pressed into the plastic body of the drive wheel hub 24 to secure the mechanical integrity with the wheel.

The motor 20 shown in FIG. 9 is mounted by motor mounting screws 72 to a motor mounting plate 74. A bearing plate 76 is interconnected with both the heavy duty aluminum tubings 10 of the chair frame and the motor mounting plate 74 by bolts 78. The motor shaft 22 is aligned with an axle 80 received in a bearing 82 mounted in the bearing plate 76. A drive insert 84 surrounds at least the motor shaft 22.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A battery powered, joystick controlled wheelchair comprising:

a battery adapted to provide a supply of power, a joystick adapted to provide voltages proportionate to degrees of lean from a neutral position from said supply of power, a master power switch adapted to turn said supply of power to said joystick on and off, detecting means for detecting whether the voltages produced are forward or reverse direction voltages, pulse width modulating means for providing pulse width modulation resulting in a pulse train, amplifying means adapted to amplify said pulse train to deliver driving power with a polarity consistent with a detected direction, motors which are driven by said driving power and which, in turn, drive the wheelchair, a battery container defining a volume within which said battery is receivable, a lid which is hinged on said battery container so as to be movable between an open position and a shut position and which serves as a platform upon which the battery can be laid, and a battery contact adapted to contact a battery terminal when said lid is moved to said shut position.

2. The wheelchair according to claim 1, wherein the pulse train is proportionate to the degrees of lean.

3. The wheelchair according to claim 1, wherein the master power switch is also adapted to turn power supplied to the amplifying means on and off.

4. The wheelchair according to claim 1, wherein the battery contact is adapted to contact the battery terminal securely and automatically.

* * * * *